E. C. AUSTIN.
NUT LOCK.
APPLICATION FILED NOV. 1, 1915.

1,206,793.

Patented Dec. 5, 1916.

Witnesses:

Inventor:
Ernest C. Austin,
William E. Hann. by Rummler & Rummler Attys.

UNITED STATES PATENT OFFICE.

ERNEST CHARLES AUSTIN, OF CHICAGO, ILLINOIS.

NUT-LOCK.

1,206,793.  Specification of Letters Patent.  Patented Dec. 5, 1916.

Application filed November 1, 1915. Serial No. 59,043.

*To all whom it may concern:*

Be it known that I, ERNEST C. AUSTIN, a subject of Great Britain, and a resident of Chicago, county of Cook, and State of Illinois, have invented certain new and useful Improvements in Nut-Locks, of which the following is a specification.

It is well known in the art that a split spring washer set to spiral form to provide oppositely facing cutting shoulders is efficient as a nut lock, and that it possesses excellent manufacturing qualities such as simplicity and inexpensiveness. However, there is a serious fault in this type of nut lock due to the fact that when the nut is rotated to remove the same the upwardly projecting shoulder on the spring washer cuts into and badly mutilates the bearing surfaces of the nut and the work.

The main object of the present invention is to provide an improved form of nut lock of this general type that will not mutilate the nut or the work in the act of unscrewing the nut, and that is simple, inexpensive and efficient.

Figure 1:
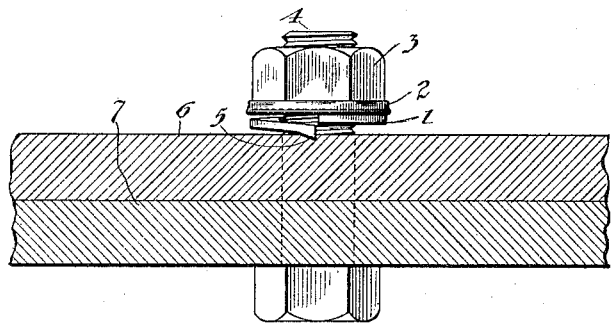
Figure 2:
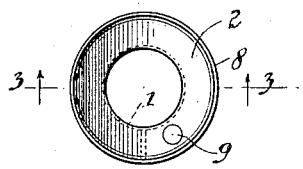
Figure 3:
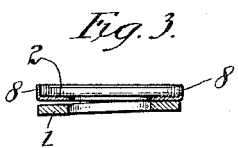
Figure 5:
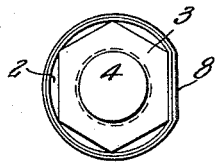
Figure 4:
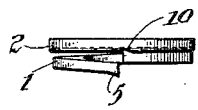

An illustrative embodiment of this invention is shown in the accompanying drawings, in which:

Figure 1 is an elevation showing the improved nut lock in use, the nut being partly backed off. Fig. 2 is a top plan of the nut lock. Fig. 3 is a vertical section of the same taken on the line 3—3 of Fig. 2. Fig. 4 is a side elevation of a modified form of the nut lock. Fig. 5 is a top plan, showing the upstanding rim of the cup washer bent in against one side of the nut.

In general terms, my improved nut lock comprises a washerlike structure adapted for insertion between the nut and a part secured thereby and having a spring position with a cutting shoulder adapted to positively grip said part and having a bendable element adapted to engage a flat side of the nut.

In the form shown in the drawings, the nut lock comprises two members in the form of washers 1 and 2 secured together and arranged for use with the nut 3 and bolt 4, as in Fig. 1. The member 1 may be a split washer of the common spring type, preferably made of hard steel and provided with a cutting shoulder 5 for bearing upon and engaging the surface 6 of the work 7. The member 2 may be a cup-shaped washer having a peripheral flange 8, and is preferably made of soft material in order that the upstanding flange thereof may be readily bent inward at any convenient point to bear against the side of the nut 3. This member presents a smooth surface to the under bearing surface of the nut 3.

The two members may be rigidly joined together in any convenient manner, as by spot welding as shown at 9 in Fig. 2, thereby forming a unitary structure which can be conveniently handled and which requires no special skill in applying it to the bolt when in use.

In the modification shown in Fig. 4, the members are not joined together but relative rotation in the direction for removing the nut is prevented by the upwardly projecting oppositely facing shoulder 10 on the spring washer 1. In this form the shoulder 10 cuts into the soft material of the washer 2.

In operation the device is first put onto the bolt with the flanged face outward and then the nut is screwed down tightly thereon. The flange 8 of washer 2 may then by a light tap thereon be bent inwardly at any convenient point or points, so as to bear against a flat side of the nut 3. Backward rotation of the nut and members 1 and 2 as a unit is prevented by the shoulder 5 biting into the surface which it is bearing upon. Relative rotation of the two washers is prevented by the spot welding of Fig. 1, or by the upwardly projecting shoulder 10 on washer 1 engaging the under surface of the washer 2, as in Fig. 4.

No attempt has been made to illustrate every specific embodiment within the scope of the invention, and it will be understood that details of the construction shown may be altered or omitted without departing from the spirit of this invention as defined by the following claims. It is preferable, though not essential, that the parts be connected permanently in the form of a unitary structure for convenience in handling and using the same. It is also preferable from the standpoint of manufacture to make the device from two parts since the nut-engaging part should be bendable without danger of breaking it while the work-engaging part should be tempered to a proper degree of hardness. This can best be accomplished by using two grades of steel each suited to its respective purpose.

I claim:

1. A nut lock, comprising a washer for insertion between a nut and the part which is held thereby and having a shoulder bendable into and out of position to engage a flat side of the nut, and a spring mounted shoulder having a cutting edge for penetrating the surface of said part.

2. A nut lock, comprising a spring washer provided with a shoulder for engaging the surface to which it is applied, and a member secured to said washer and adapted to be bent to engage the side of a nut.

3. A nut lock, comprising a spring washer and a cup washer, said spring washer being provided with a shoulder for engaging the surface to which it is applied, said cup washer being provided with a flange which may be bent to coact with the side of a nut to prevent rotation thereof relative to the washers, and means for preventing rotation of said washers relatively to each other.

Signed at Chicago this 30th day of October 1915.

ERNEST CHARLES AUSTIN.

Copies of this patent may be obtained for five cents each, by addressing the "Commissioner of Patents, Washington, D. C."